US007088512B2

(12) United States Patent
Haga

(10) Patent No.: US 7,088,512 B2
(45) Date of Patent: Aug. 8, 2006

(54) IMAGE STABILIZATION APPARATUS AND BINOCULAR EQUIPPED WITH IMAGE STABILIZATION APPARATUS

(75) Inventor: Shunichi Haga, Kodaira (JP)

(73) Assignees: Nikon Vision Co., Ltd., Tokyo (JP); Nikon Corportation, Tokyo (JP)

( * ) Notice: Subject to any disclaimer, the term of this patent is extended or adjusted under 35 U.S.C. 154(b) by 43 days.

(21) Appl. No.: 10/751,918

(22) Filed: Jan. 7, 2004

(65) Prior Publication Data

US 2004/0136068 A1 Jul. 15, 2004

(30) Foreign Application Priority Data

Jan. 8, 2003 (JP) ............... 2003-002411

(51) Int. Cl.
*G02B 27/64* (2006.01)
(52) U.S. Cl. .......................... 359/554; 396/55
(58) Field of Classification Search ............... 359/554, 359/555, 557; 396/52–55
See application file for complete search history.

(56) References Cited

U.S. PATENT DOCUMENTS

| 3,659,494 A | 5/1972 | Philbrick et al. .............. 89/28 |
| 5,181,056 A * | 1/1993 | Noguchi et al. .............. 396/55 |
| 5,402,197 A * | 3/1995 | Okano et al. .................. 396/55 |
| 5,845,156 A | 12/1998 | Onuki .......................... 396/52 |
| 6,035,134 A | 3/2000 | Sato et al. .................... 396/55 |
| 6,384,976 B1 | 5/2002 | Ishijima et al. ............. 359/557 |
| 6,515,799 B1 | 2/2003 | Ishijima et al. ............. 359/557 |
| 2002/0093739 A1 | 7/2002 | Ishijima et al. ............. 359/557 |
| 2002/0196544 A1* | 12/2002 | Notagashira ................. 359/557 |
| 2003/0231393 A1 | 12/2003 | Yamamoto et al. ......... 359/557 |

FOREIGN PATENT DOCUMENTS

| EP | 0 587 432 | 9/1993 |
| EP | 0 834 761 | 4/1998 |
| JP | 10-213832 | 8/1998 |
| JP | 2001-100106 | 4/2001 |

* cited by examiner

*Primary Examiner*—Drew A. Dunn
*Assistant Examiner*—Mark Consilvio
(74) *Attorney, Agent, or Firm*—Miles & Stockbridge PC

(57) ABSTRACT

An image stabilization apparatus is adapted, in order to maintain the position of at least one optical member that constitutes an optical system, to control the angle of the at least one optical member relative to the optical axis of the optical system. The image stabilization apparatus comprises fixing means for, when a predetermined event is detected while the aforementioned control is performed, fixing the angle of the at least one optical member to the angle it assumes at the moment said event is detected.

12 Claims, 5 Drawing Sheets

IMAGE STABILIZATION APPARATUS AND BINOCULAR EQUIPPED WITH IMAGE STABILIZATION APPARATUS

This application claims the benefit of Japanese Patent application No. 2003-002411 which is hereby incorporated by reference.

BACKGROUND OF THE INVENTION

1. Field of the Invention

The present invention relates to an image stabilization apparatus to be equipped in an optical apparatus such as a monocular, a binocular or a video camera.

2. Related Background Art

A pan/tilt control method for a conventional image stabilization apparatus is disclosed for example in Japanese Patent Application Laid-Open No. 2001-100106. The prior art disclosed in this document is an image stabilization apparatus provided with an erecting prism, a gimbal suspension member on which said erecting prism is mounted, an angular velocity and position feedback control means for controlling the position of the gimbal suspension member to realize a vibration reduction function. In this apparatus, upon pan/tilt operation, gain of the position feedback control means is varied either manually in accordance with a requirement by an operator or automatically based on the detected pan/tilt operation, so that follow-up performance of the gimbal suspension member to the optical axis of the objective lens is enhanced and smooth panning/tilting is realized.

However, in the aforementioned prior art, movement of the prism portion is to simulate external vibration under pan/tilt operation in order to enhance follow-up performance of the gimbal suspension mechanism to the optical axis of the objective lens. Therefore, this prior art suffers from the problem that when a pan/tilt operation is performed, the vibration reduction performance is deteriorated and the target object in the field of view is greatly vibrated.

SUMMARY OF THE INVENTION

An object of the present invention is to improve visibility of the image under pan/tilt operation in an image stabilization apparatus for optical apparatuses.

In order to attain the above object, according to the present invention, there is provided an image stabilization apparatus adapted, in order to maintain the position of at least one optical member that constitutes an optical system, to control the angle of the at least one optical member relative to the optical axis of the optical system, comprising fixing means for, when a predetermined event is detected while the aforementioned control is performed, fixing the angle of the at least one optical member to the angle it assumes at the moment said event is detected.

In the image stabilization apparatus according to the present invention, it is preferable that the fixing means comprises detection means for detecting the angle of the at least one optical member at the moment when said event occurs, storing means for storing the angle detected by the detection means, and signal output means for outputting a signal for maintaining the direction of the at least one optical member at the stored angle.

In the image stabilization apparatus according to the present invention, it is preferable that the image stabilization apparatus further comprises driving means for controlling the angle of the at least one optical member and the fixing means comprises restraining means provided in the driving means, for restraining movement of the driving means and signal output means for outputting a signal to command the restraining means to restrain the movement.

In the image stabilization apparatus according to the present invention, it is preferable that the apparatus further comprises receiving means for receiving an operation command so that the fixing means regards the operation command received through the receiving means as said event to perform the fixation.

A binocular according to the present invention is equipped with the above-described image stabilization apparatus according to the present invention.

DETAILED DESCRIPTION OF THE PREFERRED EMBODIMENTS

In the following, a first embodiment of the present invention will be described. The following description of the embodiment is directed to an arrangement in which an image stabilization apparatus is equipped in an optical apparatus in the form of a binocular. However, it should be understood that the present invention can also be applied to other optical apparatuses than binoculars. For example, the present invention can be applied to various optical apparatuses in which vibration reduction is desired, such as monocular apparatuses such as telescopes, video cameras, and cameras.

In the following, a binocular equipped with an image stabilization apparatus as the first embodiment of the present invention will be described by way of example with reference to FIGS. 1 to 4.

Figure 2:
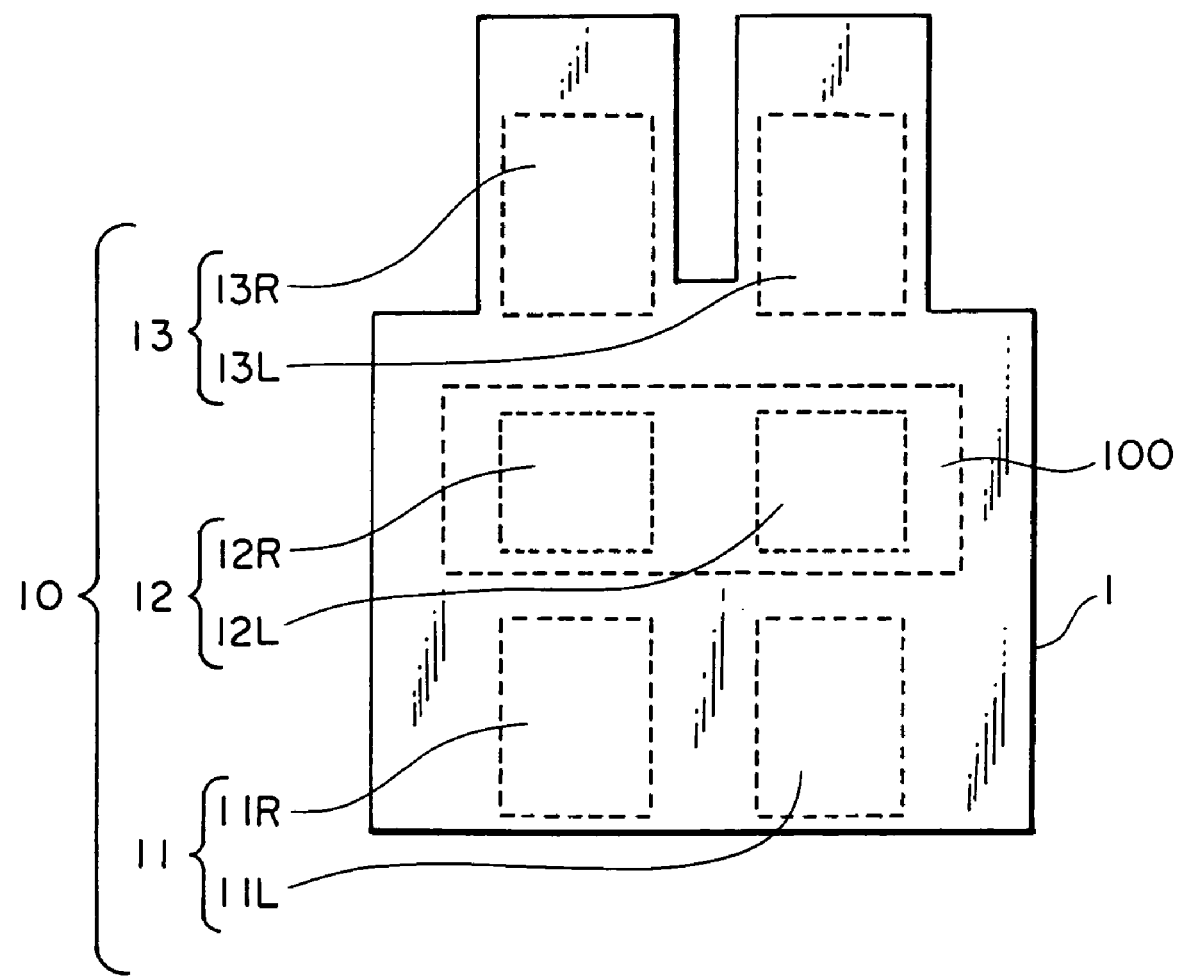
FIG. 2 is a diagram illustrating the inner structure of the binocular according to the first embodiment.

FIG. 2 is a diagram illustrating the interior of the binocular according to the embodiment.

As shown in FIG. 2, the binocular equipped with an image stabilization apparatus according to the present embodiment is provided with a binocular optical system 10, a housing 1 accommodating the binocular optical system 10 and an image stabilization apparatus 100 for reducing vibration of the image created by vibration such as hand shake applied on the housing.

The binocular optical system 10 includes an objective optical system 11, an eyepiece optical system 13 and an intermediate optical system 12 disposed between the objective optical system 11 and the eyepiece optical system 13. The objective optical system 11 includes objective lenses 11R and 11L. The eyepiece optical system 13 includes eyepiece lenses 13R and 13L. The intermediate optical system 12 is adapted to direct light fluxes from the objective optical system 11 to the eyepiece optical system 13. The intermediate optical system 12 is used for optical correction to avoid a target under observation from going out of the field of view when vibration occurs in the binocular. The intermediate optical system 12 includes erecting prisms 12R and 12L for example. The erecting prism has the function of converting an inverted image into an erected image.

The housing 1 accommodates at least the objective optical system 11, the eyepiece optical system 13 and the image stabilization apparatus 100. In this embodiment, the housing 1 and the aforementioned intermediate optical system 12 are disposed in such a way that they can change their relative angular position.

Figure 3A:
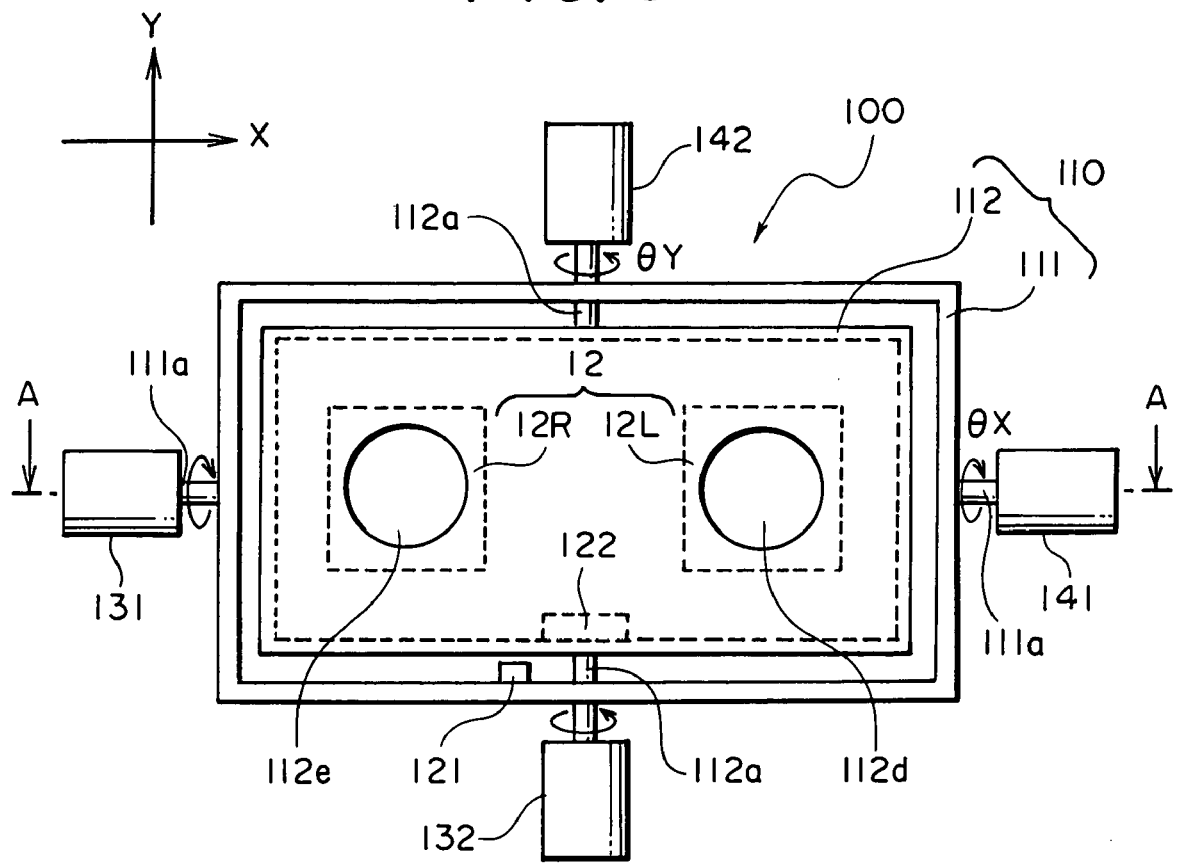
FIG. 3A is a front view showing the structure of an image stabilization apparatus of the binocular according to the first embodiment.
Figure 3B:
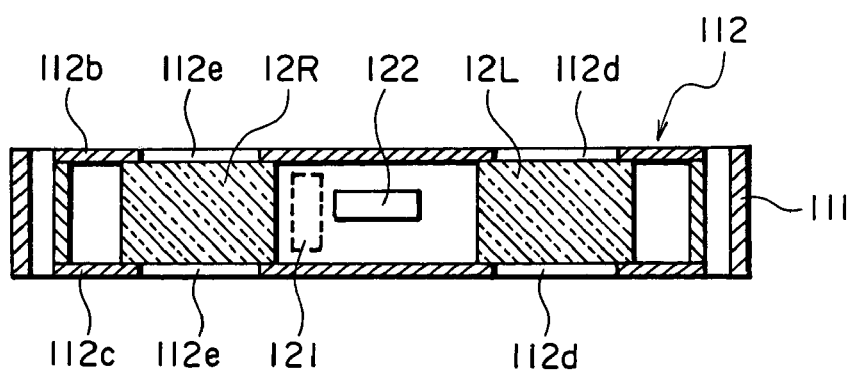
FIG. 3B is a cross sectional view taken along line A—A in FIG. 3A.

FIGS. 3A and 3B illustrate the structure of the image stabilization apparatus 100 according to this embodiment as seen from the front side and from above respectively.

As shown in FIGS. 3A and 3B, the image stabilization apparatus 100 has a gimbal suspension mechanism 110 that holds the intermediate optical system 12 in such a way as to allow angular displacement of the intermediate optical system 12 about two rotation axes. The gimbal suspension mechanism 110 serves as means for holding the intermediate optical system 12 with two rotary shafts against the housing 1 in such a way as to allow angular displacement.

The gimbal suspension mechanism 110 includes an outer gimbal suspension member 111 with a rotation axis along the X direction and an inner gimbal suspension member 112 with a rotation axis along the Y direction.

The inner gimbal suspension member 112 is supported by a rotary shaft 112a in such a way as to be rotatable relative to the outer gimbal suspension member 111. The outer gimbal suspension member 111 is supported by a rotary shaft 111a in such a way as to be rotatable relative to the housing 1.

The inner gimbal suspension member 112 holds the erecting prisms 12R and 12L between two plate-like members 112b and 112c as shown in FIG. 3B. The plate-like members 112b and 112c have openings 112d and 112e respectively at the positions of the left and right optical paths.

With the above-described structure, when vibration occurs in the housing 1 or a pan/tilt operation is performed, the gimbal suspension members 111 and 112 are rotated relative to the housing 1 respectively by inertial force in such a way that the direction of the optical axes of the erecting prisms 12R and 12L will be kept unchanged relative to the inertial system (i.e. with respect to the earth).

On the outer gimbal suspension member 111, there is mounted an angular velocity detector 121 for detecting the angular velocity $\omega x$ of the rotational movement about the rotary shaft 111a oriented in the X-axis direction. On the inner gimbal suspension member 112, there is mounted an angular velocity detector 122 for detecting the angular velocity $\omega y$ of the rotational movement about the rotary shaft 112a oriented in the Y-axis direction. The angular velocity detectors 121 and 122 may be composed, for example, of piezoelectric vibration gyro sensors.

In addition, an angular displacement detector 141 for detecting an angular displacement (i.e. a change in the angular position) $\theta x$ caused by rotation is attached to the rotary shaft 111a oriented in the X-axis direction. Furthermore, an actuator 131 for rotationally driving the rotary shaft 111a that has been rotationally displaced in the rotational direction for returning back the rotary shaft 111a is also attached to the rotary shaft 111a. Similarly, an angular displacement detector 142 for detecting an angular displacement $\theta y$ caused by rotation and an actuator 132 for rotationally driving the rotary shaft 112a that has been rotationally displaced in the rotational direction for returning back the rotary shaft 112a are attached to the rotary shaft 112a oriented in the Y-axis direction.

Thus, the angular displacement of the rotation of the outer and inner gimbal suspension members 111 and 112 about axes in the X direction and the Y direction can be detected based on outputs of the angular displacement detectors 141 and 142.

The actuators 131 and 132 are adapted to create rotational drive in such a direction as to bring the optical axis of the erecting prisms 12R and 12L held by the gimbal suspension members 111 and 112 that have been rotated by inertial force to coincide with the optical axis of the objective optical system 11. The direction to which the optical axis of the erecting prism 12R, 12L (i.e. the optical axis of the intermediate optical system 12) is to be brought to coincide will be referred to as an original position hereinafter.

The actuators 131 and 132 may be constructed as, for example, servo mechanisms. The angular displacement detectors 141 and 142 may include rotary encoders.

Figure 4:
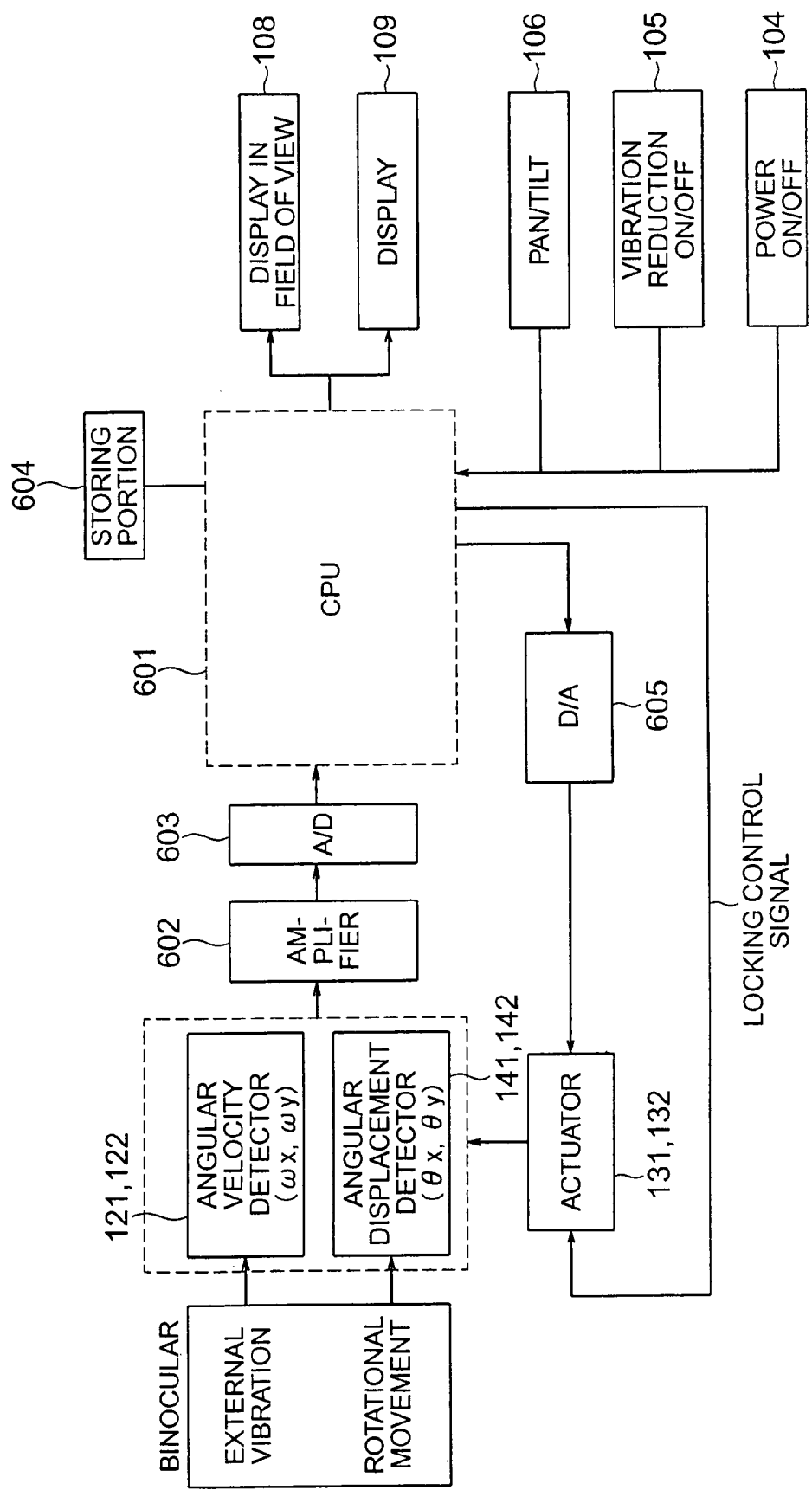
FIG. 4 is a block diagram showing the constitution of the image stabilization apparatus of the binocular according to the first embodiment.

FIG. 4 is a block diagram of the image stabilization apparatus 100 according to the embodiment.

As shown in FIG. 4, the image stabilization apparatus includes a CPU 601, an amplifier 602, an A/D converter 603, a storing portion 604 and a D/A converter 605. This control system is disposed in the interior of the housing 1.

Figure 1A:
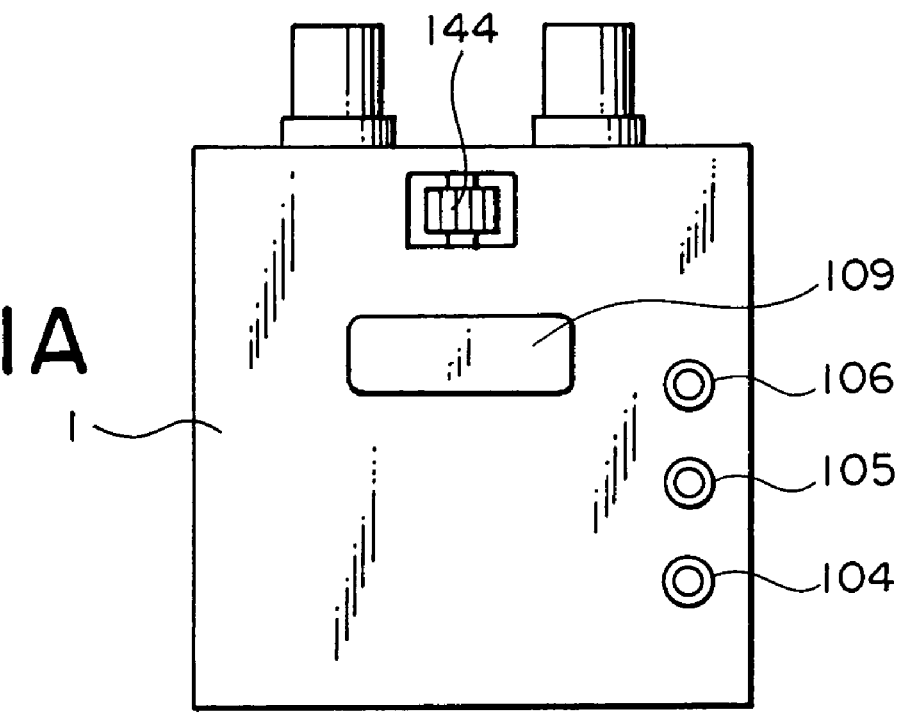
FIG. 1A is a top view of a binocular according to a first embodiment of the present invention.
Figure 1B:
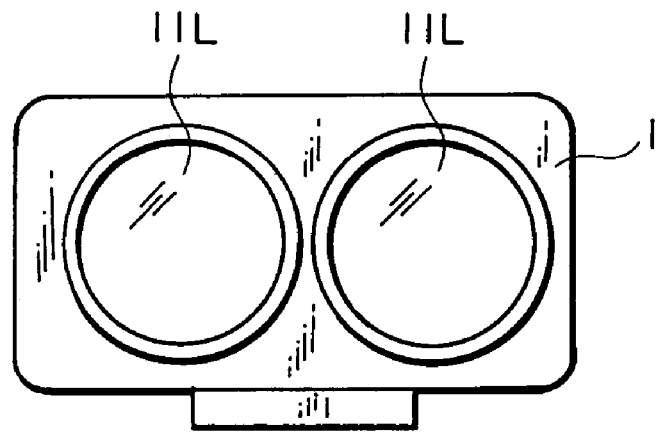
FIG. 1B is a back view of the binocular according to the first embodiment of the present invention.
Figure 1C:
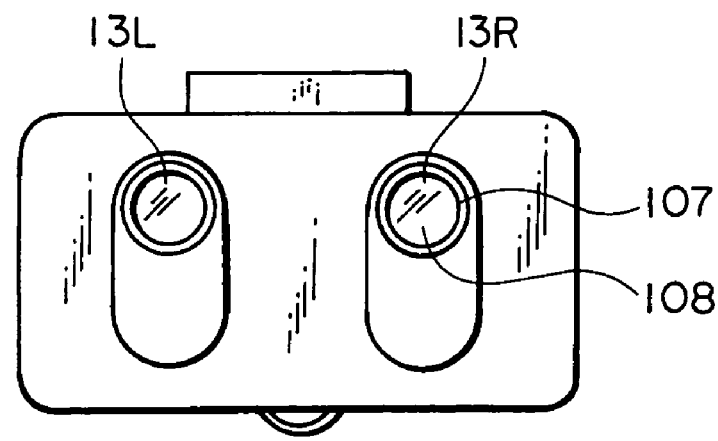
FIG. 1C is a front view of the a binocular according to the first embodiment of the present invention.

FIGS. 1A, 1B and 1C are a plan view, a front view and back view respectively showing the external appearance of the binocular equipped with the image stabilization apparatus 100 according to the present invention.

As shown in FIG. 1A, the image stabilization apparatus 100 is provided with a power on/off button 104, a vibration reduction on/off button 105 and a pan/tilt button 106. The operational commands entered through these buttons are sent to the CPU 601 as shown in FIG. 4. The CPU 601 has functions of detecting the status of respective buttons.

The power on/off button 104 is used to control power supply to the image stabilization apparatus 100. Upon depression of the power on/off button 104, electric power is supplied to the image stabilization apparatus 100.

In response to the depression of the power on/off button 104, the CPU 601 makes the vibration reduction on/off button 105 active and loads a program for realizing the vibration reduction function stored in the storing portion 604. Upon receiving a turning-off command, the CPU 601 executes a process (i.e. initialization) for bringing the optical axis of the intermediate optical system 12 to coincide with the optical axis of the objective optical system 11 and then stops power supply to the image stabilization apparatus 100.

The vibration reduction on/off button 105 is used for entering commands for enabling and disabling the vibration reduction function. The vibration reduction on/off button is adapted to switch the enabled and disabled states of the vibration reduction function alternately.

In accordance with the command from the vibration reduction on/off button 105, one binocular can be used as a binocular with a vibration reduction function when the vibration reduction function is in the enabled state and as a normal binocular when the vibration reduction function is in the disabled state.

Upon receiving a command for switching to the vibration reduction mode from the vibration reduction on/off button 105, the CPU starts a process for stabilizing the image in accordance with the program.

Upon receiving a turning-off command, the CPU 601 causes the optical axis of the intermediate optical system 12 to coincide with the optical axis of the objective optical system 11 and stops the process. This is because the binocular is to be used as a normal binocular when the vibration reduction function is disabled.

However, the power is kept on so that the vibration reduction function can be started immediately when the mode is switched to the vibration reduction mode again.

The pan/tilt button 106 is an operational part that is made active under the vibration reduction mode. This button is used for entering user's intention to perform a pan/tilt operation. In the following description, the state in which this button is depressed will be referred to as pan/tilt mode. The CPU 601 has a function of detecting the depressed state of this button and interprets its depressed state as the pan/tilt mode to perform a process that will be described later.

When the user removes the finger from this button, the CPU 601 disables the pan/tilt mode to return the image stabilization apparatus to the vibration reduction mode.

While in the arrangement shown in FIG. 1A the aforementioned buttons are disposed on the top surface of the housing 1, they may be disposed at any position on the housing 1 so long as they can be manipulated.

The power on/off button 104 and the vibration reduction on/off button 105 may be constructed as a single button in which the functions of them are combined.

The image stabilization apparatus 100 includes a display in the field of view 108 provided in the field of view 107 of either one of the eyepiece lenses 13R and 13L. The display in the field of view 108 is composed, for example, of an LED, which is to be turned on under the pan/tilt mode.

In addition, on the top surface of the housing 1, there is provided a display 109 for displaying the on/off state of the power on/off button 104 and the vibration reduction on/off button 105 or the like and a focusing knob 144 for adjusting focus. The display 109 is composed, for example, of an LCD.

It is apparent that the display device for the display 109 and the display in the field of view 108 are not limited to the above-mentioned types, but it may be an EL or other devices.

In the following, the control process of the CPU 601 of the image stabilization apparatus 100 will be described.

When the power on/off button 104 is depressed, the CPU 601 reads in a program stored in the storing portion 604 in advance. Then, when the vibration reduction on/off button 105 is turned on, the CPU 601 shifts to the vibration reduction mode in accordance with the program.

Under the vibration reduction mode, the CPU 601 obtains information on displacement of the body of the binocular caused by external vibration based on detection signals of the angular velocity ($\omega x$, $\omega y$) and the angular displacement ($\theta x$, $\theta y$) of the gimbals 111a and 112a input through the A/D converter 603, calculates a control amount for that displacement, drives the actuators 131 and 132 with control signals generated by the D/A converter 605 so that the erecting prisms 12R and 12L are controlled to maintain their original positions. Thus, the image is stabilized.

Under this state, when the mode is shifted to the pan/tilt mode by depression of the pan/tilt button 106, the CPU 601 turns the LED of the display in the field of view 108 on and sets the angular displacement determined by the angular displacement signal at the moment when the pan/tilt button 106 is depressed as the original position. Then, the CPU 601 outputs a locking control signal to the actuators 131 and 132 directly so as to constrain (or lock) the optical axis of the intermediate optical system 12 (or the erecting prisms 12R and 12L) to the newly set original direction.

The actuators 131 and 132 receive the locking control signal to drive the rotary shafts 111a and 112a in such a way as to maintain the newly set original position.

In this way, in this image stabilization apparatus 100, the optical axis of the intermediate optical system 12 is maintained in (or locked to) the direction it assumes when the pan/tilt button 106 is depressed.

The locking of the intermediate optical system 12 is continued until the finger is removed from the pan/tilt button 106. In response to removal of the finger from the pan/tilt button 106, the CPU 601 sets the center of the optical axis of the objective optical system 11 as the original position and returns to the aforementioned vibration reduction mode.

As described above, in the binocular provided with the image stabilization apparatus 100 according to the present invention, when pan/tilt operation is performed under the state in which the vibration reduction mode is selected by the user, the optical axis of the intermediate optical system 12 is locked in the direction in which it is oriented at that moment and the vibration reduction function is temporarily suspended. This eliminates the process for moving the optical axis of the intermediate optical system 12 toward the direction of the optical axis of the objective optical system 11, which is necessary in the conventional image stabilization apparatus. In addition, since a sufficient feedback gain for restraint can be set irrespective of vibration reduction performance, influence of inertia and time lag upon shift is reduced and the positional displacement of the field image can be reduced. Therefore, follow-up performance during pan/tilt operation can be enhanced. This can also be said for the time when the pan/tilt mode is released.

The apparatus of this embodiment is arranged in such a way that the shift to the pan/tilt mode is realized in accordance with user's intention entered through manipulation of the pan/tilt button 106. In other words, the pan/tilt mode is enabled for the time period during which the user intends to use the pan/tilt mode.

While the apparatus of the above-described embodiment is provided with the pan/tilt button 106 so that the user intentionally brings the image stabilization apparatus 100 into the pan/tilt mode or releases the pan/tilt mode, the present invention is not limited to this particular feature.

For example, as described in Japanese Patent Application Laid-Open No. 2001-100106 (which was referred to before as a prior art), the apparatus may be arranged in such a way that the apparatus is brought into the pan/tilt mode automatically when the angular displacement detected by the angular displacement detector 141, 142 becomes larger than a predetermined value to performs the process same as the aforementioned process under the state in which the pan/tilt button 106 is depressed and that the pan/tilt mode is released automatically when the angular velocity becomes lower than a predetermined value.

In this case, even a user who is inexperienced in operating the image stabilization apparatus 100 can use the apparatus under the mode most suitable for the operation.

Next, a modification in which locking of the intermediate optical system 12 in the first embodiment is effected mechanically will be described as a second embodiment.

Figure 5:
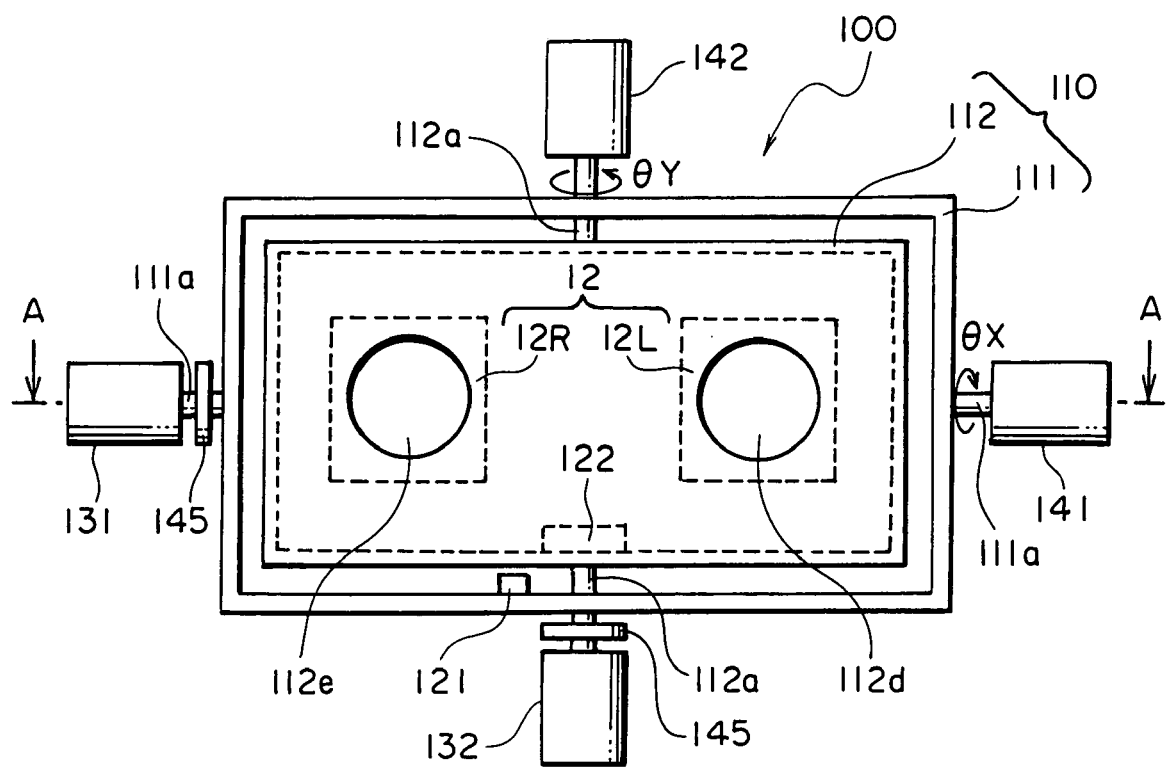
FIG. 5 is a front view showing the structure of an image stabilization apparatus of a binocular according to a second embodiment of the present invention.
Figure 6:
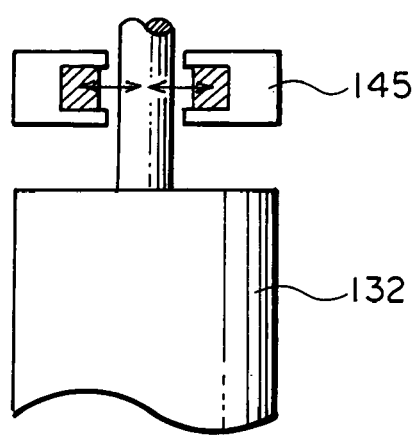
FIG. 6 is an enlarged view showing an openable and closable cramp according to the second embodiment.

FIG. 5 is a front view showing the structure of the image stabilization apparatus 100 according to the second embodiment. FIG. 6 is an enlarged view showing an openable and closable locking cramp 145.

The image stabilization apparatus 100 according to the second embodiment is provided with an openable and closable locking cramp 145 disposed at the shaft portion of each of the actuators 131 and 132 as shown in FIG. 5. The other portions of the apparatus of the second apparatus than the openable and closable locking cramp 145 are basically the same as those of the first embodiment, and therefore the description thereof will be omitted.

As shown in FIG. 6, the openable and closable locking cramp 145 has a cramping portion made of a high friction material such as a rubber, and it is adapted to lock and unlock driving of the shaft portion of the actuator 131, 132 with its opening and closing movement.

In this embodiment, the CPU 601 outputs a locking control signal to the actuators 131 and 132 when it receives a signal indicative of depression of the pan/tilt button 106. In this case, the locking control signal is a command for cramping the opening portion of the openable and closable locking cramp 145 to lock the shaft portions of the actuators 131 and 132 with frictional force.

Upon receiving the locking control signal, the actuators 131 and 132 cramp the opening portions of the respective openable and closable locking cramps 145 so as to lock the rotary shafts 111a and 112a at the angular positions they assume at the moment when the locking control signal is received.

When the pan/tilt button 106 is released, the CPU 601 stops outputting the locking control signal. When the outputting of the locking control signal is stopped, the actuators 131 and 132 broaden the opening portions of the openable and closable locking cramps 145 to release the locking of the rotary shafts 111a and 112a. Thus, the control returns to the normal vibration reduction mode.

In this case also, the locking control signal is not necessarily required to be output in response to a command from the pan/tilt button 106, but it may be automatically output in response to detection of pan/tilt operation based on the intensity of the angular displacement detection signal.

In this embodiment also, when the operation mode is shifted to the pan/tilt mode, the rotary shafts 111a and 112a are locked at the angular positions they assume at that moment. Therefore, the vibration reduction mode can be suspended instantaneously, and target follow-up performance in the pan/tilt operation under the state in which the vibration reduction mode is set can be enhanced.

The locking of the actuators 131 and 132 may be realized by a combination of a mechanical locking mechanism and an electric locking mechanism.

According to the above-described embodiments, in a binocular having a vibration reduction function, on the occasion when pan/tilt operation is desirable such as when a bird or an airplane abruptly comes into the field of view, the vibration reduction function is temporarily suspended by continuous depression of a pan/tilt button or based on automatic detection of pan/tilt operation. With this feature, vibration of the target image is avoided and it is possible to follow the target quickly and easily. In addition, the vibration reduction function can be restarted instantaneously by releasing the button.

More specifically, according to the above-described embodiments, in an apparatus for stabilizing the image by controlling the angle of the optical axis of an intermediate optical system to maintain the position of the intermediate optical system relative to the inertial system, when it is detected that the user has entered a command to shift to pan/tilt operation or when it is detected that pan/tilt operation is performed, the angle of the intermediate optical system is fixed at the angle at that moment. With this feature, in an optical apparatus such as a binocular provided with an image stabilization apparatus, follow-up performance under pan/tilt operation is enhanced without deteriorating its vibration reduction performance.

As per the above, according to the present invention, it is possible to realize an image stabilization apparatus having an improved usability with a simple structure.

While in the above description of the embodiments, the supporting mechanism has been described as a gimbal suspension mechanism by way of example, it is not limited to that particular mechanism. The supporting mechanism can be of any form so long as it can support the intermediate optical system in such a way as to allow angular displacement.

While in the above description of the embodiments, an intermediate optical system including erecting prisms has been described by way of example, a variable angle prism may also be used in the intermediate optical system. In the case that a variable angle prism is used, the effects of the present invention can be realized by fixing the angle formed by two glass plates that retain liquid at an arbitrary position.

In the present invention, the occasion on which an optical member is fixed is not limited to the occasion of panning or tilting, but the fixation of the optical member may be performed by the user at any desired moment. Therefore, the user can use the image stabilization apparatus under the state he or she desires.

In the above-described embodiment, the position of an optical member is fixed in response to manipulation of a pan/tilt operation button. However, the fixation of the optical member is not necessarily required to be performed in response to manipulation of the pan/tilt button. For example, the apparatus may be provided with a detector for detecting the magnitude of vibration of an optical member as described in Japanese Patent Application Laid-Open No. 2001-100106 so that a control portion determines whether or not the movement of the image stabilization apparatus is interpreted as a pan/tilt operation based on vibration of the optical member detected by the detector, and fixation of the optical member may be performed in response to a signal generated by that determination. In this case, it is not necessary for the user to enter a command for fixation of the optical member by manipulation of a button etc.

According to the present invention, it is possible to obtain an eye-friendly image under panning or tilting with an image stabilization apparatus for an optical apparatus or the like.

What is claimed is:

1. An image stabilization apparatus adapted, in order to maintain a position of at least one optical member of an optical system, to control an angle of said at least one optical member relative to an optical axis of said optical system, comprising:

fixing means for, when a predetermined event is detected while said control is performed, fixing the angle of said at least one optical member to an angle it assumes at the moment said event is detected.

2. An image stabilization apparatus according to claim 1, wherein said fixing means comprises:

detection means for detecting an angle of said at least one optical member at the moment when said event occurs;

storing means for storing the angle detected by said detection means; and signal output means for outputting a signal for maintaining the direction of said at least one optical member at said stored angle.

3. An image stabilization apparatus according to claim 1, further comprising driving means for controlling the angle of said at least one optical member, wherein said fixing means comprises restraining means provided in said driving means, for restraining movement of the driving means and signal output means for outputting a signal to command said restraining means to restrain the movement.

4. An image stabilization apparatus according to claim 1, further comprising receiving means for receiving an operation command, wherein said fixing means regards the operation command received through said receiving means as said event.

5. A binocular equipped with an image stabilization apparatus according to claim 1.

6. An image stabilization apparatus according to claim 1, wherein said event is an event accompanying panning or tilting of the image stabilization apparatus.

7. An image stabilization apparatus according to claim 2, further comprising receiving means for receiving an operation command, wherein said fixing means regards the operation command received through said receiving means as said event.

8. An image stabilization apparatus according to claim 3, further comprising receiving means for receiving an operation command, wherein said fixing means regards the operation command received through said receiving means as said event.

9. A binocular equipped with an image stabilization apparatus according to claim 2.

10. A binocular equipped with an Image stabilization apparatus according to claim 3.

11. An image stabilization apparatus according to claim 1, wherein said event is a change in mode to a pan or tilt mode.

12. An image stabilization apparatus adapted to control an angle of at least one optical member of an optical system, relative to an optical axis of the optical system, comprising:

a control unit which operates to lock the angle of said optical member at whatever angle said optical member is disposed upon detection of a predetermined event, wherein said event is a change in mode to a pan or tilt mode.

* * * * *